United States Patent
Walch et al.

(10) Patent No.: US 6,612,102 B2
(45) Date of Patent: Sep. 2, 2003

(54) MOWER COMPRISING A WINDROW GROUPING MECHANISM

(75) Inventors: Martin Walch, Dettewiller (FR); Bernard Wattron, Haegen (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/118,359

(22) Filed: Apr. 9, 2002

(65) Prior Publication Data

US 2002/0152733 A1 Oct. 24, 2002

(30) Foreign Application Priority Data

Apr. 18, 2001 (FR) .............................. 01 05265

(51) Int. Cl.⁷ .............................................. A01B 43/00
(52) U.S. Cl. ...................................................... 56/192
(58) Field of Search .................... 56/10.6, 10.7, 56/10.8, 11.9, 14.5, 14.9, 192, 193, 15.5, 15.9

(56) References Cited

U.S. PATENT DOCUMENTS

| | | | |
|---|---|---|---|
| 2,666,518 A | 1/1954 | Page, Jr. |
| 4,627,226 A | 12/1986 | De Coene |
| 5,060,462 A | 10/1991 | Helfer et al. |
| 5,094,063 A | 3/1992 | Wattron et al. |
| 5,107,663 A | 4/1992 | Wattron et al. |
| 5,199,249 A | 4/1993 | Wattron et al. |
| 5,199,250 A | 4/1993 | Ermacora et al. |
| 5,357,737 A | 10/1994 | Ermacora et al. |
| 5,417,042 A | 5/1995 | Walch et al. |
| 5,423,165 A | 6/1995 | Walch et al. |
| 5,507,136 A | 4/1996 | Walch |
| 5,522,208 A | 6/1996 | Wattron |
| 5,749,390 A | 5/1998 | Ermacora et al. |
| 5,794,424 A | 8/1998 | Ermacora et al. |
| 5,901,533 A | 5/1999 | Ermacora et al. |
| 5,901,537 A | 5/1999 | Walch et al. |
| 5,992,133 A | 11/1999 | Walch et al. |
| 6,003,291 A | 12/1999 | Ermacora et al. |
| 6,055,800 A | 5/2000 | Walch |
| 6,085,501 A | 7/2000 | Walch et al. |
| 6,101,796 A | 8/2000 | Wattron et al. |
| 6,189,306 B1 | 2/2001 | Walch |
| 6,269,619 B1 | 8/2001 | Walch et al. |
| 6,308,504 B1 | 10/2001 | Walch et al. |
| 6,334,292 B1 | 1/2002 | Walch et al. |

FOREIGN PATENT DOCUMENTS

| | | |
|---|---|---|
| CA | 1 248 763 | 1/1989 |
| FR | 2 559 344 | 8/1985 |
| GB | 1 541 971 | 3/1979 |
| GB | 2 094 606 | 9/1982 |

Primary Examiner—Robert E. Pezzuto
(74) Attorney, Agent, or Firm—Oblon, Spivak, McClelland, Maier & Neustadt, P.C.

(57) ABSTRACT

The mower of the present invention comprises a frame, a cutting mechanism supported by the frame, and a windrow grouping mechanism. In turn, the windrow grouping mechanism comprises a longitudinal conveying device and a transverse conveying device. The mower of the present invention is notable in that the longitudinal conveying device comprises at least one roller, the longitudinal axis of which is substantially perpendicular to a direction of forward travel of the mower. The roller is driven in rotation about the longitudinal axis so that its surface transports a product, cut by the cutting mechanism, toward the rear of the mower.

15 Claims, 4 Drawing Sheets

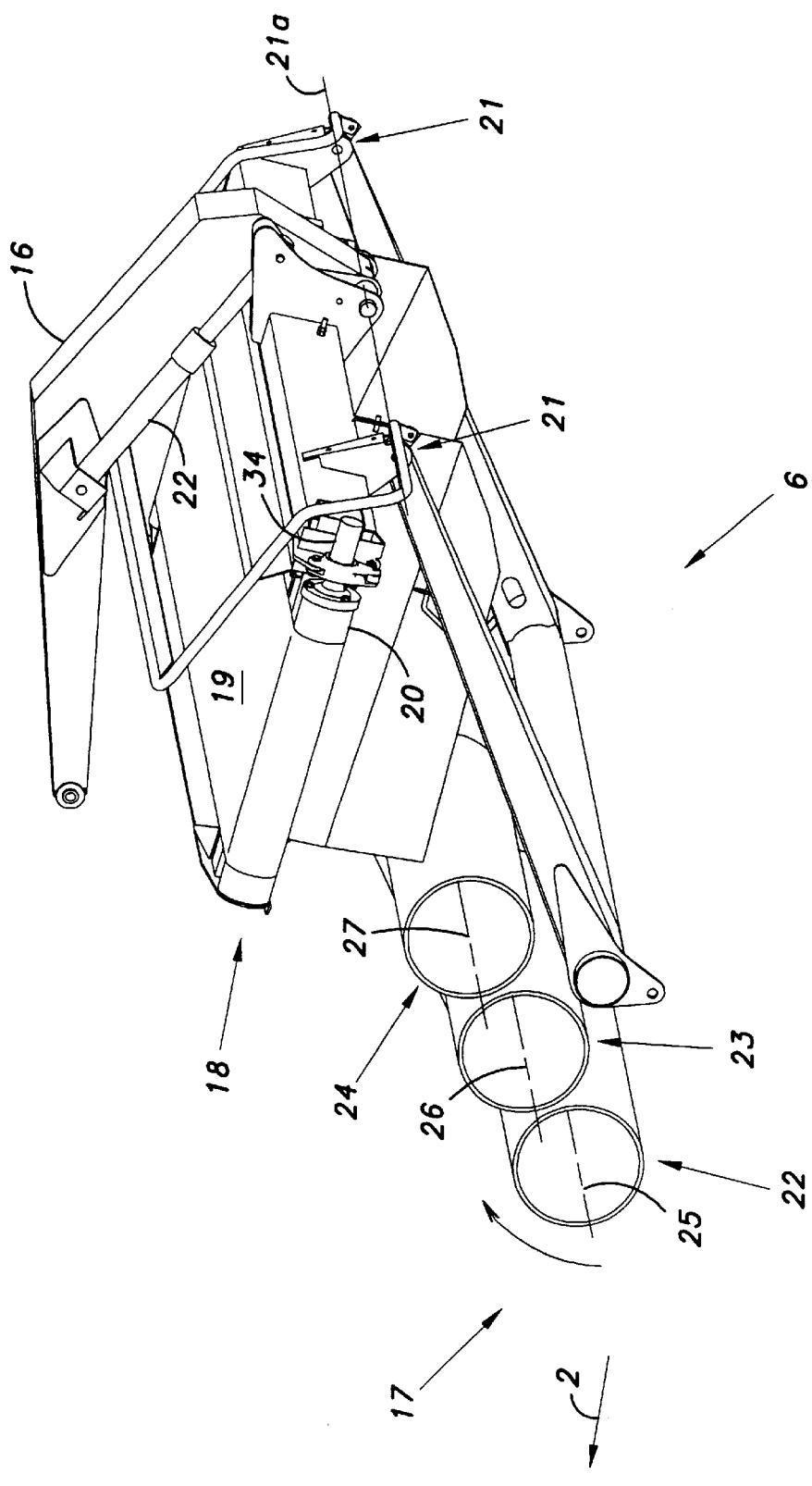

MOWER COMPRISING A WINDROW GROUPING MECHANISM

BACKGROUND OF THE INVENTION

1. Field of the Invention

The present invention relates to the overall technical field of agricultural machinery. It relates more specifically to a mower comprising:

- a frame,
- a cutting mechanism supported by said frame, and
- a mechanism for grouping windrows comprising a longitudinal conveying device and a transverse conveying device.

2. Discussion of the Background

Such a mower is known in the state of the art. Indeed, VICON's "KMT/KMR 2400-3000-3200" brochure describes a trailed conditioning mower equipped with a belt-type grouper. In a way known to those skilled in the art, this mower comprises a cutting mechanism connected to a frame resting on the ground by means of two wheels. The belt-type grouper, arranged behind the cutting mechanism, is also supported by the frame. The cutting mechanism is intended to cut a standing product, for example grass. For its part, the grouper advantageously allows the product cut in at least two consecutive passes of the mower to be grouped together into a single windrow. What happens is that, during a first pass, the grouper of this known machine is pivoted upward into an inactive position. The product cut by the cutting mechanism is therefore deposited on the ground in the continuation of the mower. During a second pass, the grouper is lowered into an active position. In this case, the product cut by the cutting mechanism is transported, by means of the belt-type grouper, to be deposited to the side of the mower and onto the windrow from the first pass.

In this known machine, the grouper is made up of a first belt running along a longitudinal axis of the mower and of a second belt arranged transversely to the mower. The first belt is intended to convey the forage from the cutting mechanism to deposit it onto the second belt. The latter in turn transports the forage to deposit it on the ground to the side of the mower. To this end, the first belt is produced by means of an endless belt wrapped around two cylinders. One of the cylinders, the axis of which is substantially horizontal, is arranged behind the cutting mechanism. The second cylinder, identical to the first cylinder, is, for its part, arranged above the second belt.

This known embodiment of a longitudinal conveying device does, however, have a drawback. Specifically, in order to convey all of the cut product, the first belt is practically as wide as the cutting mechanism. In the case of mowers with wide cutting widths, it is then commonplace for the width of the first belt to exceed the distance between the two cylinders of which it is made. Such a configuration makes the endless belt difficult to guide over the cylinders. During work, this belt has a tendency to slip along the axis of said cylinders and therefore to rub against the structure of the grouper. This rubbing reduces the performance of the grouper and may even lead to tearing of the endless belt.

SUMMARY OF THE INVENTION

The purpose of the present invention is to overcome this drawback of the state of the art.

To this end, the mower according to the present invention is one wherein said longitudinal conveying device comprises at least one roller, the longitudinal axis of which is substantially perpendicular to a direction of forward travel of said mower, driven in rotation about said longitudinal axis so that its periphery transports the product, cut by the cutting mechanism, toward the rear of said mower. Thus, said mower does not have the drawback, described hereinabove, associated with the use of a very wide belt.

BRIEF DESCRIPTION OF THE DRAWINGS

Other features of the invention, to be considered separately or in any possible combination, will become further apparent from the following description of a nonlimiting exemplary embodiment of the invention depicted in the appended drawings in which:

FIG. 4 depicts, viewed in perspective on arrow IV defined in FIG. 2, and on a different scale, the windrow grouping mechanism of FIG. 3 in the inactive position.

DESCRIPTION OF THE PREFERRED EMBODIMENTS

Figure 1:
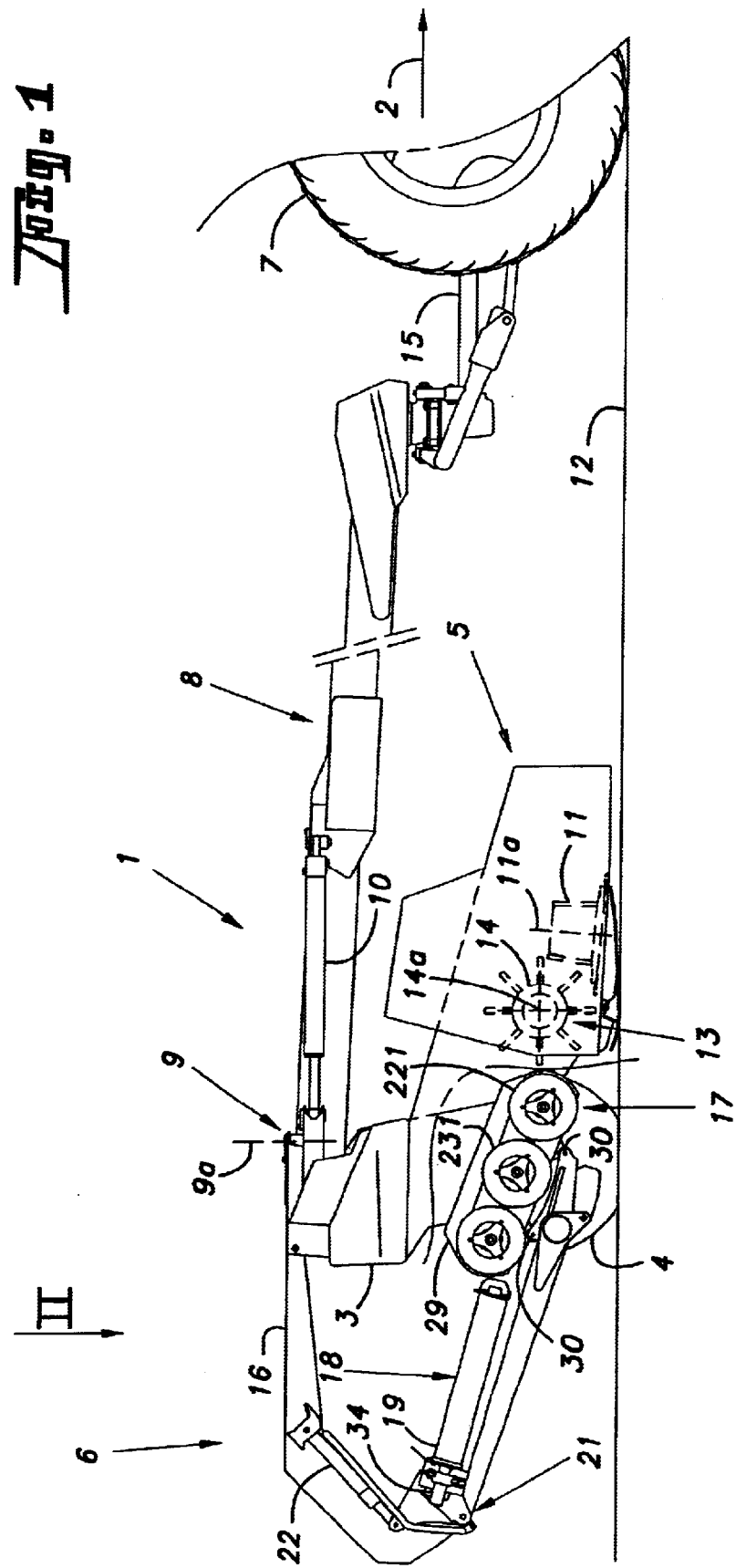
FIG. 1 depicts, in side view, a mower according to the present invention.
Figure 2:
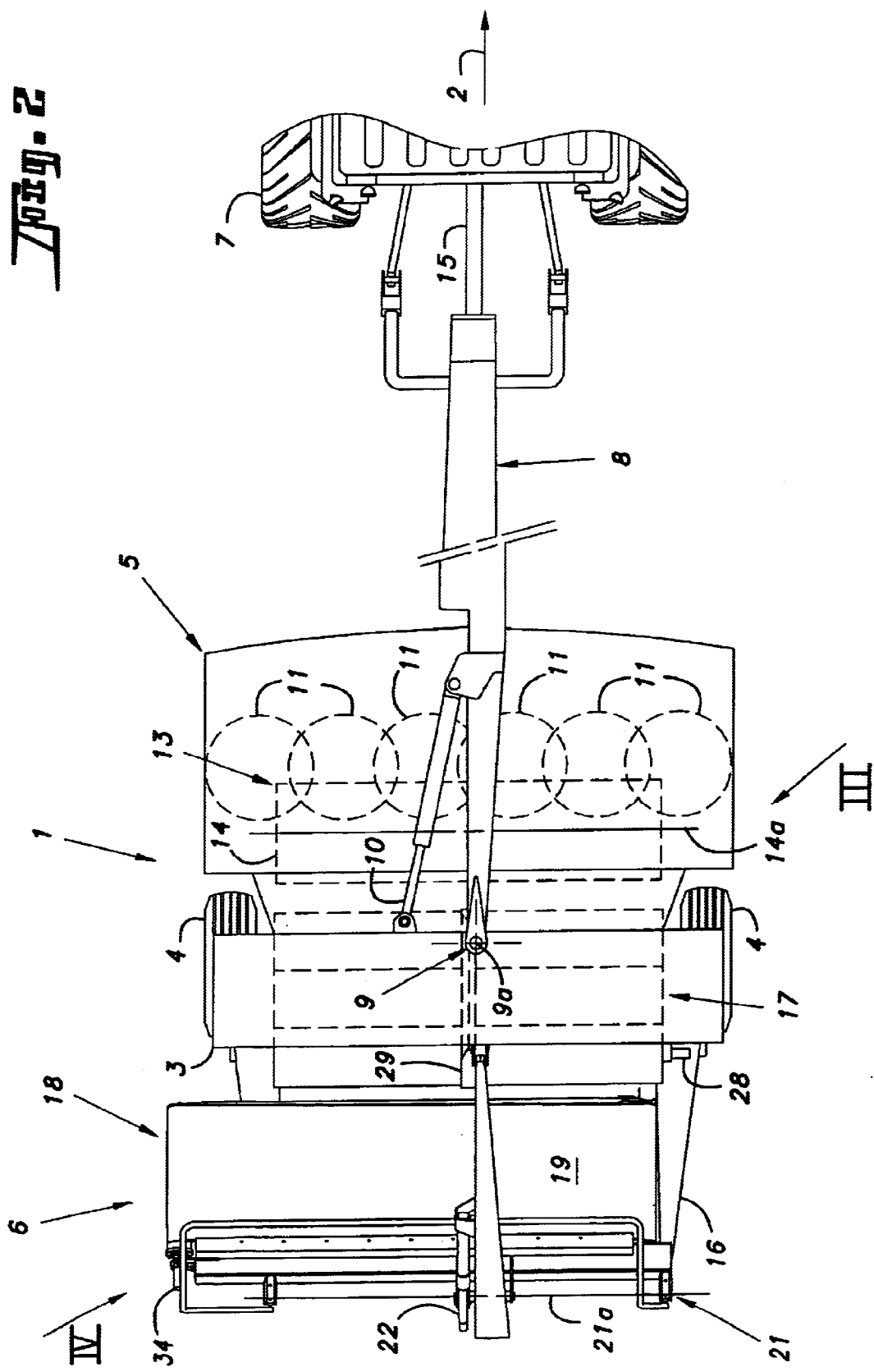
FIG. 2 depicts, viewed on arrow II defined in FIG. 1, the mower of FIG. 1.

The mower 1 depicted in FIGS. 1 and 2 is trailed in a direction and sense of forward travel indicated by the arrow 2. In the description that follows, the ideas of "front" and "rear", "in front of" and "behind" are defined with respect to the direction of forward travel 2, and the ideas of "right" and "left" are defined when looking at said mower 1 from the rear in the direction of forward travel 2.

In a way known to those skilled in the art, said mower 1 comprises a frame 3 running along the ground by means of two wheels 4. Said frame 3 supports, on one hand, a cutting mechanism 5 and, on another hand, a windrow grouping mechanism 6.

In the exemplary embodiment depicted in FIGS. 1 and 2, said frame 3 is connected to the rear of a tractor vehicle 7 by means of a drawbar 8. Said drawbar 8 is connected to said frame 3 by means of an articulation 9 the axis 9a of which is directed upward. Said articulation 9 advantageously allows said mower 1 to occupy, with respect to said tractor vehicle 7, a transport position and at least one work position. More specifically, in the light of FIG. 2, said articulation 9 is situated at least substantially in a vertical mid-plane of said mower 1. Thus, in a way known to those skilled in the art, said mower 1 can be arranged in the continuation of said tractor vehicle 7, as depicted in FIG. 2, to make it easier to transport by road. By pivoting said drawbar 8 with respect to said frame 3 about said articulation 9, said mower 1 can also be moved to the right or to the left of said tractor vehicle 7. These two positions, used during work, advantageously allow said mower 1 to work back and forth. In the exemplary embodiment depicted in FIGS. 1 and 2, the pivoting of said drawbar 8, and therefore the placement in the work position or the placement in the transport position, is brought about by means of a ram 10 connected, on one hand, to said frame 3 and, on another hand, to said drawbar 8.

In FIG. 1, said frame 3 has been partially depicted in section so as to make said windrow grouping mechanism 6 visible. In FIGS. 1 and 2, it will also be noted that not all of the length of said drawbar 8 has been depicted.

In a way known to those skilled in the art, said cutting mechanism 5 is connected to said frame 3 by means of a suspension device. During work, as depicted in FIG. 1, said cutting mechanism 5 rests at least partially on the ground 12. Said suspension device advantageously allows at least some of the weight of said cutting mechanism 5 to be transferred to said frame 3. In addition, said suspension device allows said cutting mechanism 5 to follow the unevenness of said ground 12 independently of said frame 3. Such a suspension device is known to those skilled in the art and will therefore not be described further and, for reasons of clarity, has not been depicted in the figures.

Said cutting mechanism 5 comprises cutting members 11 intended to cut a standing product, these members being arranged in a line at least substantially perpendicular to said direction of forward travel 2. Each cutting member 11, depicted symbolically in FIG. 2, is driven in rotation about an upwardly-directed respective axis 11a.

In the exemplary embodiment depicted in FIGS. 1 and 2, said cutting mechanism 5 also comprises a treatment device 13 intended to accelerate the drying of said cut product. In a way known to those skilled in the art, said treatment device 13 is produced by means of a conditioning rotor 14 arranged behind said cutting members 11. Said rotor 14 is driven in rotation about an axis 14a which is substantially horizontal and perpendicular to said direction of forward travel 2.

The cutting members 11 and the treatment device 13 of said cutting mechanism 5 are driven in rotation, off a power take-off of said tractor vehicle 7, by means of transmission members 15. Said transmission members 15 are known to those skilled in the art and will therefore not be described further.

For its part, said windrow grouping mechanism 6 is intended to group together, into a single windrow, the product cut during at least two consecutive passes of said mower 1. For that purpose, said windrow grouping mechanism 6 is arranged behind said cutting mechanism 5. In addition, said windrow grouping mechanism 6 comprises a bearing structure 16 supporting, on one hand, a longitudinal conveying device 17 and, on another hand, a transverse conveying device 18. Said longitudinal conveying device 17 makes it possible to transport, in a direction opposite to said direction of forward travel 2, the product cut by said cutting mechanism 5. Said transverse conveying device 18 makes it possible, for its part, to move the cut product from said longitudinal conveying device 17 in a direction advantageously perpendicular to said direction of forward travel 2.

In the exemplary embodiment depicted in the figures, said windrow grouping mechanism 6 works as follows.

During a first pass of said mower 1, said transverse conveying device 18 is rendered inactive. The product, cut by the cutting mechanism 5 and transported to the rear by means of said longitudinal conveying device 17, is thus deposited in the continuation of said mower 1.

During a second pass of said mower 1, said transverse conveying device 18 is activated. As a result, the product, cut by the cutting mechanism 5 then transported to the rear by means of said longitudinal conveying device 17 and finally moved sideways by said transverse conveying device 18, is thus deposited to the side of said mower 1 and onto the windrow from said first pass.

To do this, in the exemplary embodiment depicted in the figures, said transverse conveying device 18 is connected to said bearing structure 16 by means of an articulation 21 the axis 21a of which is substantially horizontal and perpendicular to said direction of forward travel 2. Said transverse conveying device 18 can thus occupy at least one substantially horizontal position (FIGS. 1, 2, 3) and at least one retracted position (FIG. 4). In addition, said transverse conveying device 18 comprises an endless belt 19 wrapped around two cylinders 20. Said cylinders 20 are advantageously directed in said direction of forward travel 2. At least one of said cylinders 20 is driven in rotation about its longitudinal axis by means of a motor 34.

In the substantially horizontal position (FIGS. 1, 2, 3), the cut product from said longitudinal conveying device 17 drops onto the top of said endless belt 19. In consequence, said transverse conveying device 18 is active. By contrast, in the retracted position (FIG. 4), said transverse conveying device 18 is pivoted upward about said articulation 21. The cut product from said longitudinal conveying device 17 passes under said endless belt 19 and drops directly onto the ground. Said transverse conveying device 18 is therefore inactive.

The pivoting of said transverse conveying device 18 about said articulation 21 is advantageously brought about by means of a ram 22. As this embodiment of a transverse conveying device 18 is known to those skilled in the art, it will not be described further in detail. It will be noted that said endless belt 19 has not been depicted in FIG. 3, in order to make said cylinders 20 visible.

For its part, said longitudinal conveying device 17 comprises, according to an important feature of the present invention, at least one roller the longitudinal axis of which is substantially perpendicular to said direction of forward travel 2 of said mower 1. Said roller is additionally driven with a rotational movement about said longitudinal axis so as to transport said cut product.

In the exemplary embodiment depicted in the figures, said longitudinal conveying device 17 comprises three rollers 22, 23, 24 arranged, one behind the next, between said cutting mechanism 5 and said transverse conveying device 18. Each roller 22, 23, 24 has a respective longitudinal axis 25, 26, 27 which is substantially horizontal and substantially perpendicular to said direction of forward travel 2.

As a preference, said longitudinal axes 25, 26, 27 are mutually parallel and lie in the same plane. In the light of FIG. 1, the front of said plane is advantageously directed toward the ground. What actually happens is that said transverse conveying device 18 lies a relatively significant distance off the ground so that the cut product can be thrown out a long way to the side during the second pass of said mower 1. Said longitudinal conveying device 17 therefore also has the role of lifting the forage up from said cutting mechanism 5 as far as said transverse conveying device 18.

In order to transport the cut product, each roller 22, 23, 24 is driven with a rotational movement about said respective longitudinal axis 25, 26, 27. In the exemplary embodiment depicted in the figures, one of said rollers 24 is driven in rotation by means of a hydraulic motor 28. This rotational movement is then transmitted to the other rollers 22, 23 by means of transmission elements (not depicted).

Figure 3:
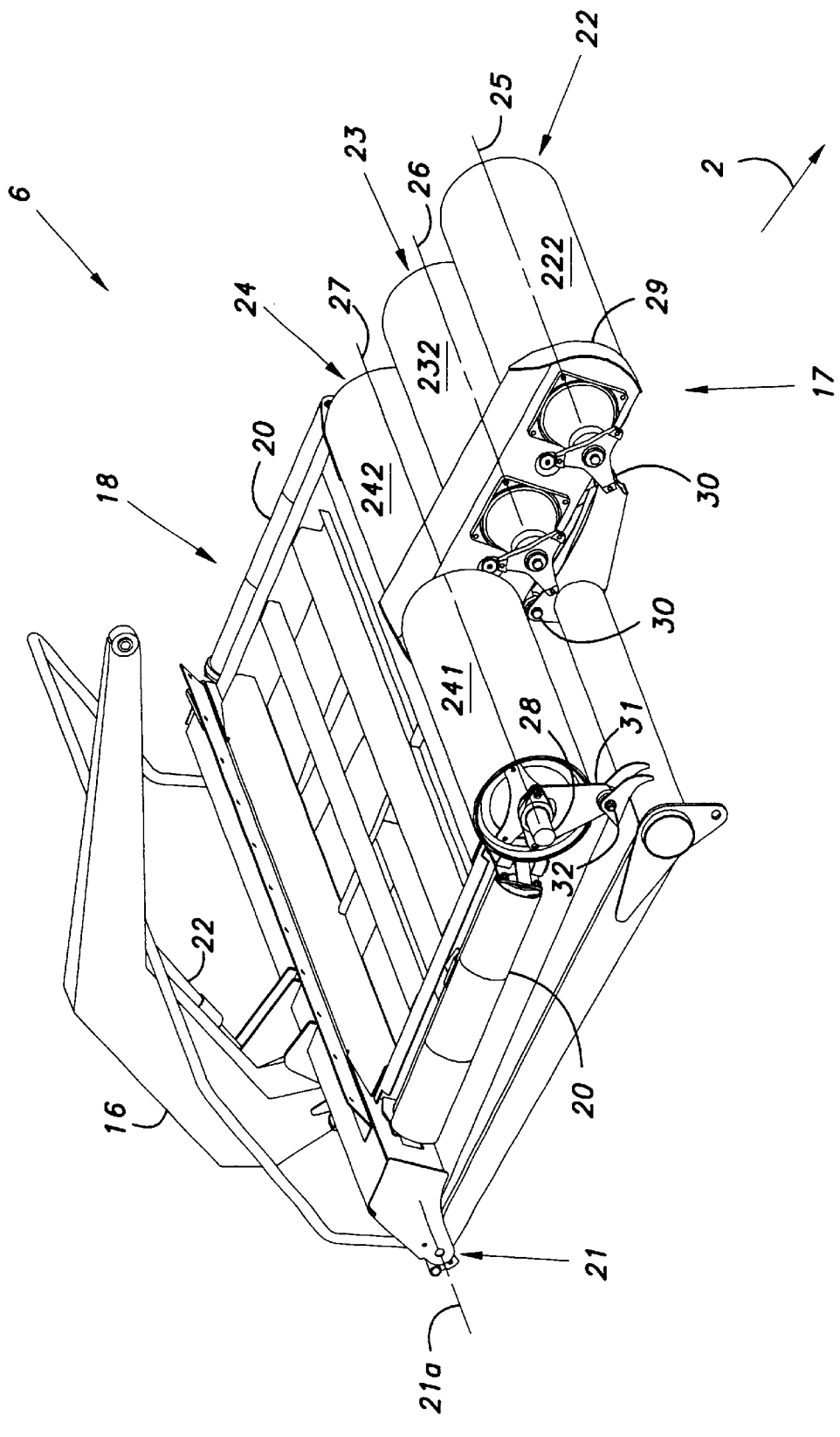
FIG. 3 depicts, viewed in perspective on arrow III defined in FIG. 2, and on a different scale, an exemplary embodiment of the windrow grouping mechanism.

In the exemplary embodiment depicted in the figures and more specifically in FIG. 3, each roller 22, 23, 24 is made up of two half-rollers 221, 222; 231, 232; 241, 242 arranged on each side of a vertical mid-plane of said mower 1. Said half-rollers 221, 222; 231, 232; 241, 242 have a respective longitudinal axis that is at least substantially coincident with said respective longitudinal axis 25, 26, 27. For reasons of clarity, the two half-rollers 221; 231 situated in front and to the right of said longitudinal conveying device 17 have not been depicted in FIG. 3.

Said half-rollers 221, 222; 231, 232; 241, 242 are connected to said bearing structure 16 by means of a casing 29 arranged at least substantially in said vertical mid-plane. Said casing 29 on one hand guides the half-rollers 221, 222; 231, 232; 241, 242 and, on another hand, transmits said rotational movement. For this purpose, said casing 29 contains said transmission elements (not depicted), produced, for example, in the form of a train of gears, a belt or a chain. Advantageously, said casing 29 is connected to said bearing structure 16 by means of two articulations 30 equipped with dampers, for example rubber buffers.

In the light of FIG. 3, said hydraulic motor 28 is also connected to said bearing structure 16 by means of a support 31. The connection between said support 31 and said bearing structure 16 is also made by means of an articulation 32 equipped with dampers. Said support 31 also plays a part in providing said longitudinal conveying device 17 with good stability.

In a particularly advantageous way, said bearing structure 16 is connected removably to said frame 3. Said windrow grouping mechanism 6 can thus constitute a kit that can easily be added to or removed from a mower 1. Said kit may also contain a hydraulic pump (not depicted), intended to be connected to said mower 1 and driven by said transmission members 15. Said hydraulic pump will allow said hydraulic motor 28 of said longitudinal conveying device 17 and said motor 34 intended to move said endless belt 19 of said transverse conveying device 18 to be driven.

The mower which has just been described is merely one exemplary embodiment which must not in any way be taken to limit the field of protection defined by the claims which follow.

Specifically, the present invention relates also to mowers 1 comprising no conditioning device 13 or comprising a different conditioning device 13 (consisting, for example, of two contrarotating rollers).

Likewise, said longitudinal conveying device 17 may comprise a different number of rollers 22, 23, 24.

In another exemplary embodiment, not depicted, each roller 22, 23, 24 is made as a single piece. Said casing 29 is therefore arranged at one end of said rollers 22, 23, 24. As a preference, the other end of said rollers 22, 23, 24 is supported by a support. In this exemplary embodiment, said hydraulic motor 28 directly drives a transmission element present in said casing 29.

What is claimed as new and desired to be secured by Letters Patent of the United States is:

1. A mower comprising:
    a frame,
    a cutting mechanism supported by said frame, and
    a mechanism for grouping windrows comprising a longitudinal conveying device and a transverse conveying device,
        wherein said longitudinal conveying device comprises at least one roller, a longitudinal axis of said at least one roller is substantially perpendicular to a direction of forward travel of said mower, driven in rotation about said longitudinal axis so that a surface of said at least one roller transports a product, cut by said cutting mechanism, toward a rear of said mower.

2. Mower as claimed in claim 1, wherein said longitudinal conveying device comprises three rollers.

3. Mower as claimed in claim 2, wherein said rollers are substantially identical.

4. Mower as claimed in claim 2, wherein said rollers are arranged one behind the next in a same plane.

5. Mower as claimed in claim 4, wherein a front of said plane is directed toward a ground so as to lift the product cut by said cutting mechanism as far as said transverse conveying device.

6. Mower as claimed in claim 2, wherein a rotational movement is transmitted between said rollers by means of transmission elements.

7. Mower as claimed in claim 1, wherein said at least one roller is made up of two half-rollers.

8. Mower as claimed in claim 7, wherein said half-rollers are arranged on each side of a vertical mid-plane of said mower.

9. Mower as claimed in claim 7, wherein said half-rollers are connected to a casing arranged at least substantially in a vertical mid-plane of said mower.

10. Mower as claimed in claim 7, wherein one of said half-rollers is driven in rotation by means of a motor.

11. Mower as claimed in claim 1, wherein one of the ends of said at least one roller is connected to a casing.

12. Mower as claimed in claim 6, wherein one of the ends of said at least one roller is connected to a casing, and wherein said transmission elements are arranged inside said casing.

13. Mower as claimed in claim 11, wherein a motor driving said at least one roller is connected to said casing.

14. Mower as claimed in claim 11, wherein another end of said at least one roller is supported by a support.

15. Mower as claimed in claim 1, wherein said mower is a trailed mower.

* * * * *